United States Patent
Carretero et al.

(10) Patent No.: US 8,263,729 B2
(45) Date of Patent: Sep. 11, 2012

(54) METHOD FOR MAKING POLYCARBONATE

(75) Inventors: Alfredo Lopez Carretero, Aljaraque (ES); David Domingo Fuster, Oviedo (ES); Gerardo Hidalgo Llinas, Leghorn (ES); Ignacio Vic Fernandez, Santo Angel (ES); Miguel Angel Salomon Cheliz, Bajo E. (ES)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/974,197

(22) Filed: Dec. 21, 2010

(65) Prior Publication Data

US 2012/0157639 A1 Jun. 21, 2012

(51) Int. Cl.
*C08G 64/00* (2006.01)
*C08G 63/02* (2006.01)

(52) U.S. Cl. ........................................ 528/196; 528/198

(58) Field of Classification Search .................. 264/219; 528/196, 198, 219
See application file for complete search history.

(56) References Cited

U.S. PATENT DOCUMENTS

| | | | |
|---|---|---|---|
| 5,576,414 A | 11/1996 | Wilhelm et al. | |
| 7,671,165 B2 * | 3/2010 | Brack et al. | 528/196 |
| 2004/0044239 A1 | 3/2004 | Haga et al. | |
| 2006/0094856 A1 | 5/2006 | Hidalgo et al. | |

FOREIGN PATENT DOCUMENTS

JP 6065367 A 3/1994

OTHER PUBLICATIONS

International Search Report for International Patent Application No. PCT/IB2011/055799 filed Dec. 19, 2011, mailed Apr. 26, 2012, 3 pages.
Written Opinion of the International Searching Authority for International Patent Application No. PCT/IB2011/055799 filed Dec. 19, 2011, mailed Apr. 26, 2012, 5 pages.

* cited by examiner

*Primary Examiner* — Terressa Boykin
(74) *Attorney, Agent, or Firm* — Cantor Colburn LLP

(57) ABSTRACT

A method of making polycarbonate comprises polymerizing, in a melt polymerization reaction, an aromatic dihydroxy compound and a diaryl carbonate in a presence of a polymerization catalyst and producing a by-product vapor stream comprising the dihydroxy compound, the diaryl carbonate and a diaryl carbonate by-product, adding a low vapor pressure compound to the by-product vapor stream to produce a modified by-product vapor stream, introducing the modified by-product vapor stream to a separation unit, removing the volatile diaryl carbonate by-product from the modified by-product vapor stream in the separation unit to form a treated by-product stream and returning the treated by-product stream to the polymerization reaction. Alternatively, the low vapor pressure compound can be added directly to the separation unit.

38 Claims, 1 Drawing Sheet

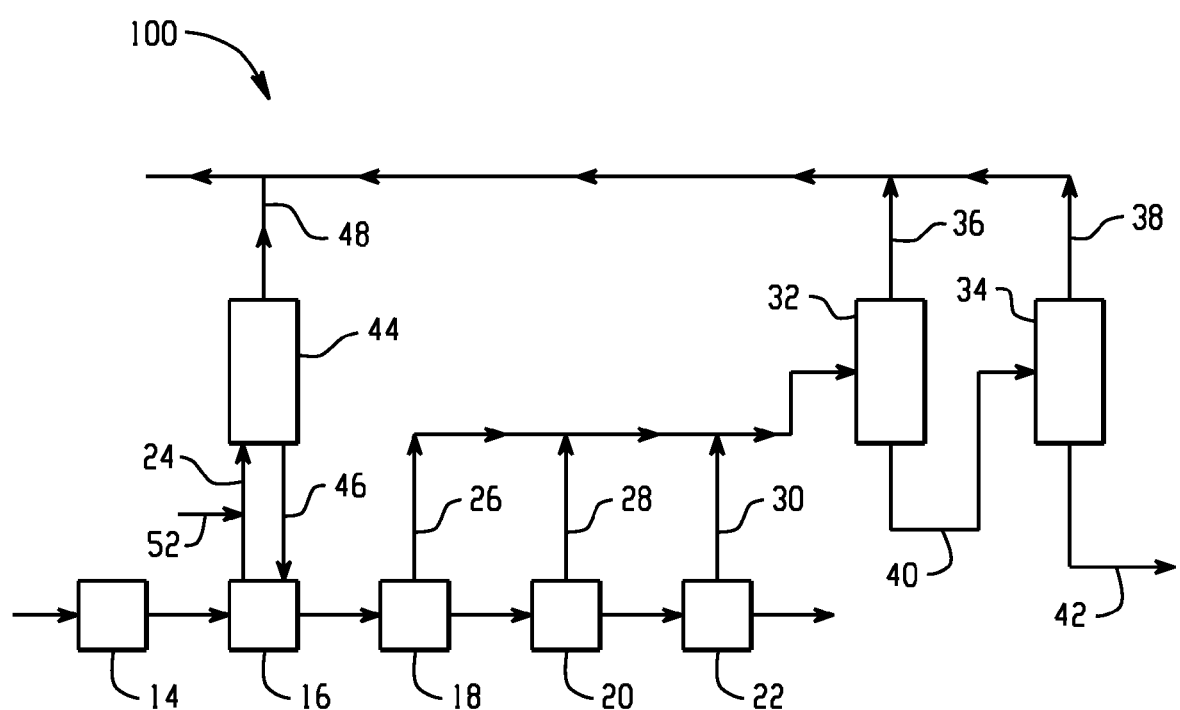

METHOD FOR MAKING POLYCARBONATE

BACKGROUND

This disclosure is directed to a method for manufacturing polycarbonates.

Aromatic polycarbonates have been widely adopted for use as engineering plastics in many fields because of their excellent mechanical properties such as high impact resistance, heat resistance, transparency, and the like.

Polycarbonates can be manufactured by reacting an aromatic dihydroxy compound with a diaryl carbonate in the presence of a polymerization catalyst. For example, the method of making an aromatic polycarbonate generally comprises an ester interchange reaction (melt polymerization method) between an aromatic dihydroxy compound and a diaryl carbonate. It is noted that this method of manufacturing aromatic polycarbonates has attracted recent attention because it is inexpensive and does not employ phosgene and methylene chloride. As such, this method is more advantageous from an environmental perspective compared to other methods employing, for example, phosgene and methylene chloride.

Separation and reuse of volatile by-products and monomers from a polymerization reaction is important if a method to prepare polycarbonates is to be economically viable and environmentally safe. In particular, when the reaction produces phenol as a by-product, continuous recovery of phenol and volatile monomers and incorporation of the recovered monomers in polymerization contributes to long-term stable operation of the polymerization method.

SUMMARY

Disclosed herein are methods of making polycarbonate.

A method of making polycarbonate comprises polymerizing, in a melt polymerization reaction, an aromatic dihydroxy compound and a diaryl carbonate in the presence of a polymerization catalyst and producing a by-product vapor stream comprising the aromatic dihydroxy compound, the diaryl carbonate and a diaryl carbonate by-product, adding a low vapor pressure compound to the by-product vapor stream to produce a modified by-product vapor stream, and removing the volatile diaryl carbonate by-product from the modified by-product vapor stream in a separation unit to form a treated by-product stream which is returned to the melt polymerization reaction.

A method of making polycarbonate comprises polymerizing, in a melt polymerization reaction, an aromatic dihydroxy compound and a diaryl carbonate in the presence of a polymerization catalyst and producing a by-product vapor stream comprising the aromatic dihydroxy compound, the diaryl carbonate and a diaryl carbonate by-product, adding a low vapor pressure compound to a separation unit, and removing the volatile diaryl carbonate by-product from the by-product vapor stream in the separation unit to form a treated by-product stream which is returned to the melt polymerization reaction.

The above-described and other features will be appreciated and understood by those skilled in the art from the following detailed description, drawings, and appended claims.

BRIEF DESCRIPTION OF THE DRAWINGS

FIG. 1 is a schematic diagram illustrating an exemplary embodiment of a system suitable for making polycarbonate.

DETAILED DESCRIPTION

The reaction of an aromatic dihydroxy compound and a diaryl carbonate to produce polycarbonate also produces a volatile aromatic hydroxyl compound as a volatile diaryl carbonate by-product. For example, when diphenyl carbonate is the diaryl carbonate then phenol is the volatile diaryl carbonate by-product. Removal of the volatile diaryl carbonate by-product during melt polymerization helps the polymerization proceed. The volatile diaryl carbonate by-product can be removed from the polymerization reaction as part of a by-product vapor stream. The by-product vapor stream can also comprise one or more monomers used in the polymerization reaction. The monomers and the volatile diaryl carbonate by-product in the by-product vapor stream are separated and the recovered monomer(s) can be returned to the polymerization reaction. Partial or total return of the monomers to the melt polymerization can help maintain the required stoichiometry in the polymerization reaction. Stoichiometry can be a key variable for the polymerization reaction to proceed to the desired molecular weight.

A separation unit is used for the continuous recovery of monomers from the by-product vapor stream. The separation unit can be a liquid/vapor separation unit, a vapor/vapor separations unit or a liquid/liquid separation unit. The volatile diaryl carbonate by-product is removed from the by-product vapor stream to form a treated by-product stream and the treated by-product stream is returned to the polymerization reaction. Removal of the volatile diaryl carbonate by-product and return of the treated by-product stream is relatively straightforward when the volatile diaryl carbonate by-product is more volatile than the monomers. For example, phenol, the by-product of diphenyl carbonate, is more volatile than bisphenol A or diphenyl carbonate. However, when one of the monomers employed in the polymerization reaction is similar in volatility to the volatile diaryl carbonate by-product at the conditions of the separation unit, removal of this diaryl carbonate by-product in the separation unit is difficult. Separation in the separation unit can also be impeded by the presence or the formation of polycarbonate oligomers in the scrubber unit.

Polycarbonate oligomers can be present in the separation unit due to a number of factors. Low molecular weight oligomers can become entrained in the by-product vapor stream. Also, when one of the monomers employed in the polycondensation reaction is similar in volatility to the volatile diaryl carbonate by-product then there is a greater concentration of monomers in the by-product vapor stream providing sufficient amounts for oligomerization to proceed in the separation unit if temperature and pressure conditions are suitable for oligomerization. Oligomerization can occur in the presence or absence of a catalyst. Polymerization catalyst can become entrained in the by-product vapor stream and facilitate oligomerization in the vapor stream line, separation unit, or both. In some cases polymerization catalyst degradation products can be volatile and have sufficient activity to facilitate the oligomerization reaction. Finally the presence of trace amounts of basic impurities can facilitate oligomerization.

Depending on conditions and/or the nature of the monomers in the separation unit, the oligomers entrained or formed in the separation unit can solidify and/or crystallize causing blockage in one or more process lines associated with the separation unit, the separation unit itself, or other equipment associated with the separation unit.

Addition of a low vapor pressure compound to the by-product stream results in a modified by-product stream. The addition of a low vapor pressure compound to the by-product vapor stream can occur either prior to introduction to the separation unit or concurrently with introduction to the separation unit. The presence of the low vapor pressure compound in the modified by-product stream can decrease or prevent oligomerization, thus facilitating removal of the volatile diaryl carbonate by-product and return of the monomers to the polymerization reaction by decreasing or eliminating interference by oligomer solidification and/or crystallization. It is also possible for the low vapor pressure compound to be added to the separation unit.

The low vapor pressure compound is defined as a compound having a vapor pressure less than the vapor pressure of the volatile diaryl carbonate by-product at the operating conditions of the separation unit. The low vapor pressure compound will have a boiling point which is at least 10 degrees higher than the boiling point of the volatile diaryl carbonate by-product at separation unit operating conditions. Separation unit operating conditions are the temperature and pressure at which the separation unit operates, i.e., the temperature and pressure within the separation unit. Separation unit operating conditions can also be described as separation unit system conditions. The low vapor pressure compound can be chosen to be one of the monomers used in the polymerization reaction. Without being bound by theory it is believed that in some cases when the low vapor pressure compound is a monomer the introduction of an excess of the monomer functions to end cap the oligomer and prevent an increase in the molecular weight of the oligomer and thus prevents oligomer solidification. Alternatively, when the polycarbonate is a copolymer the presence of an excess of one monomer may function to alter the composition of the copolymer and prevent solidification, crystallization or both. Without being bound by theory it is believed that in the case where more than one dihydroxy compound is used in the polymerization the monomer for the low vapor compound should be chosen so as to avoid crystallinity in the oligomer. For example, bisphenol A is a more effective low vapor pressure compound than hydroquinone or 4,4'-biphenol because use of the bisphenol A monomer is less likely to result in crystallinity in the oligomer.

When the low vapor pressure compound comprises a monomer the amount of monomer added to the by-product stream can be 0.2 to 5.0 weight percent of the total amount of the same monomer added to the polymerization reaction. Within this range the amount of low vapor pressure compound can be greater than or equal to 0.5 weight percent of the total amount of the same monomer added to the polymerization reaction.

Alternatively, the low-pressure compound can be an acidic compound which quenches any catalytic activity in the separation unit or by-product vapor stream. The acidic compound can be an acid or an acid salt. Examples of acidic compounds include phosphorous acid, phosphoric acid, sulfuric acid, and metal "oxo acids" such as the oxo acids of germanium, antimony, niobium and the like. Examples of acidic salts include the monosubstituted ammonium salt of phosphoric acid $((NH_4)H_2PO_4)$. Alkali metal salts and alkaline earth metal salts of acids should not be used since they can act as polymerization catalysts. Preferably the acidic compound is chosen and used in amount such that when the monomer mixture containing the acidic compound is returned to the polymerization reaction the acidic compound does not deactivate the catalyst in the polymerization reaction. Exemplary amounts are less than or equal to 300 microequivalents, more specifically less than or equal to 100 microequivalents of the acidic compound based on the moles of the dihydroxy compound present in the by-product vapor stream. The acidic compound can be used in an amount greater than or equal to 10 microequivalents based on the moles of the dihydroxy compound present in the by-product vapor stream.

Aromatic polycarbonates possess recurring structural units of the formula (I):

wherein A is a divalent aromatic radical of the dihydroxy compound employed in the polymer reaction.

The aromatic dihydroxy compound that can be used to form aromatic carbonate polymers, are mononuclear or polynuclear aromatic compounds, containing as functional groups two hydroxy radicals, each of which can be attached directly to a carbon atom of an aromatic nucleus. Dihydroxy aromatic compounds include resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,1-bis(4-hydroxyphenyl)methane, 1,1-bis(4-hydroxyphenyl)ethane, 1,2-bis(4-hydroxyphenyl)ethane, 1,1-bis(4-hydroxyphenyl)-1-phenylethane, 2,2-bis(4-hydroxyphenyl)propane ("bisphenol A", also referred to as BPA), 2-(4-hydroxyphenyl)-2-(3-hydroxyphenyl)propane 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-tert-butylphenyl)propane, 2,2-bis(4-hydroxy-3-bromophenyl)propane, and 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole and the like, as well as combinations and reaction products comprising at least one of the foregoing dihydroxy compounds.

In various embodiments, two or more different aromatic dihydroxy compounds or a copolymer of an aromatic dihydroxy compound with a glycol, with a hydroxy- or acid-terminated polyester or with a dibasic acid or hydroxy acid in the event a carbonate copolymer or interpolymer rather than a homopolymer for use in the preparation of the aromatic polycarbonate mixtures, can be employed in making the polycarbonate.

Examples of diaryl carbonates suitable for use, include, but are not limited to, diphenyl carbonate, ditolyl carbonate, bis(chlorophenyl)carbonate, m-cresyl carbonate, dinaphthyl carbonate, bis(diphenyl)carbonate, diethyl carbonate, diethyl carbonate, dibutyl carbonate, and dicyclohexyl carbonate, bismethylsalicyl carbonate (BMSC) and the like, as well as combinations and reaction products comprising at least one of the foregoing diaryl carbonates. More particularly, the diaryl carbonate can be diphenyl carbonate (DPC).

In preparing the aromatic polycarbonates, about 1.0 mole to about 1.30 moles of diaryl carbonate can be used for every mole of the aromatic dihydroxy compound. More particularly, about 1.01 moles to about 1.15 moles of diaryl carbonate can be employed.

The polymerization catalyst is a base and comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the melt reaction mixture is in a range between about $10^{-5}$ and about $10^{-8}$ moles alkaline earth or alkali metal ion per mole of diaryl carbonate present in the reaction mixture.

The quaternary ammonium compound is selected from the group of organic ammonium compounds having the structure

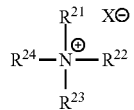

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, phenoxide anion and bicarbonate. An exemplary carboxylate is acetate.

Non-limiting examples of suitable organic ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred. It is contemplated that in polymerization reactions which comprise a crystalline polycarbonate forming monomer, such as hydroquinone or 4,4'-biphenol, it may be advantageous to employ a polymerization catalyst other than tetramethyl ammonium hydroxide.

The quaternary phosphonium compound is selected from the group of organic phosphonium compounds having the structure:

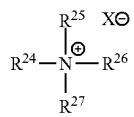

wherein $R^{24}$-$R^{27}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, phenoxide anion and bicarbonate. An exemplary carboxylate is acetate.

Suitable organic phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the above structures are properly balanced. For example, where $R^{20}$-$R^{23}$ are each methyl groups and $X^-$ is carbonate, it is understood that $X^-$ represents

$½(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide, cesium hydroxide and potassium hydroxide. Other sources of alkaline earth and alkali metal ions include salts of carboxylic acids, such as sodium acetate and carbonic acids such as cesium carbonate and derivatives of ethylene diamine tetraacetic acid (EDTA) such as EDTA tetrasodium salt, and EDTA magnesium disodium salt. Other sources of alkaline earth and alkali metal ions include alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, and alkaline earth metal salts of metal oxo acids. Specific examples of salts include $NaH_2PO_3$, $NaH_2PO_4$, $Na_2HPO_4$, $KH_2PO_4$, $CsH_2PO_4$, $Cs_2HPO_4$, $NaKHPO_4$, $NaCsHPO_4$, $KCsHPO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and combinations comprising one or more of the foregoing salts. Sodium hydroxide is often preferred as it is relatively inexpensive and used in downstream processes.

In various embodiments, the amount of quaternary phosphonium or quaternary ammonium compound employed can be about 1 microequivalents to about 1000 microequivalents based on the amount of dihydroxy compound. Particularly, about 10 microequivalents to about 500 microequivalents can be employed. More particularly, about 50 microequivalents to about 150 microequivalents can be employed.

The amount of alkali element compound, an alkaline earth metal compound, or combination comprising one or more of the foregoing catalysts is employed can be about $1\times10^{-7}$ moles to about $2\times10^{-3}$ moles, specifically about $1\times10^{-6}$ to about $4\times10^{-4}$ moles for each mole of the combination of the dihydroxy compound and the diaryl carbonate.

When a quarternary phosphonium compound is used as one of the polymerization catalysts, it decomposes at temperatures greater than or equal to about 180° C. yielding non ionic compounds such as a quaternary phosphine oxide and phosphate esters. For example, when tetrabutylphosphonium acetate is employed as the quaternary phosphonium compound, tributyl phosphine oxide (TBPO) and phosphate esters are produced. TBPO, however, is volatile and can be vaporized under the conditions of the polymerization reaction. During processing, because TBPO has a higher vapor pressure as diphenyl carbonate, for example, a significant amount of the TBPO can be distilled with the diphenyl carbonate. A fraction of the TBPO generated thus can be recycled with recovered diphenyl carbonate.

In an embodiment of making polycarbonate, the aromatic dihydroxy compound and the diaryl carbonate can be reacted at atmospheric pressure during the first stage reaction at a temperature of about 80° C. to about 250° C., particularly at a temperature of about 100° C. to about 230° C., and more particularly at a temperature of about 120° C. to about 190° C., and in general for 0.5 to about 10 hours, particularly for 0.5 to about 6 hours, and even more particularly for 0.5 to about 5 hours. The reaction temperature is then raised, while the reaction system is reduced in pressure, thus bringing about a reaction between the aromatic dihydroxy compound and the diaryl carbonate, and finally the aromatic dihydroxy compound, the diaryl carbonate, and their oligomers are subjected to a polymerization reaction at a temperature of about 240° C. to about 320° C. under reduced pressure of less than or equal to about 5 millimeters of mercury (mm Hg).

When the reaction is subjected to a reduction in pressure the by-product vapor stream is produced and sent to a separation unit. The separation unit can be a scrubber type which separates the volatile diaryl carbonate by-product from the monomers present in the stream by operating at essentially the same vacuum as the polymerization reactor and a temperature determined by the composition of the bottom product from said scrubber. Stated another way, the temperature is determined based on the monomers used in the polymerization reaction. The separation unit can also be a distillation column which operates at different pressure conditions than the polymerization reactor. The low vapor pressure compound is introduced to the by-product vapor stream, the separation unit or both the by-product vapor stream and the separation unit to prevent or decrease the formation of solidified oligomers in the separation unit and associated outlet lines.

The manufacturing method can be either a continuous or batch process. The reaction apparatus used in conducting this reaction can be a vertical, horizontal type, tube type, falling film evaporator type, or column type with or without agitation. In an embodiment, there can be at least two polymerization stages, although there are no particular restrictions on the number of stages.

In an exemplary embodiment, the apparatus in which the reaction is carried out can be a multistage reactor comprising any suitable type of tank, tube, and/or column Such reactors can be vertical stirred tank polymerization reactors, thin film evaporative polymerization reactors, horizontal stirred reactors, twin screw vented extruders, reactive distillation columns, and the like, as well as combinations comprising at least one of the foregoing reactors.

Referring now to FIG. 1, a schematic diagram of an exemplary embodiment for a process flow suitable for the practice of the present method generally designated 100 is illustrated. The diaryl carbonate and the aromatic dihydroxy compound along with the polymerization catalyst, are mixed in the monomer mix drum 14. The polymerization reaction to make polycarbonate can occur in a multistage reactor system comprising a first reactor 16, a second reactor 18, a third reactor 20, and a fourth reactor 22 connected in series and operated at increasing temperature (i.e., a reactor down stream is operated at a greater temperature than a reactor upstream) of about 150° C. to about 400° C., particularly about 250° C. to about 350° C.; and decreasing pressure (i.e., a reactor down stream is operated at a lower pressure than a reactor upstream) of about 500 Torr to about 0.01 Torr. For example, first reactor 16 is maintained at a temperature greater than or equal to about 200° C. and fourth reactor 22 is maintained at a temperature less than or equal to about 350° C. Moreover, first reactor 16 is maintained at a pressure less than or equal to about 500 Torr and fourth reactor 22 is maintained at a pressure greater than or equal to about 0.01 Torr. This method allows the volatile diaryl carbonate by-product to be removed, while building high molecular weight polycarbonate, e.g., with number average molecular weight greater than or equal to about 7,000 atomic mass units (amu).

Reactors 16, 18, 20, and 22 are configured to allow removal of the volatile diaryl carbonate by-product (e.g., phenol) as part of an overhead by-product vapor stream 24, 26, 28, and 30 respectively for each reactor. The by-product vapor streams are fed to a separation unit. For example, overhead stream 24 is fed to a separation unit (44) in fluid communication with first reactor 16. Inlet stream 52 feeds a molten low vapor pressure compound to the by-product vapor stream 24. In an alternate embodiment which is not shown the inlet stream 52 feeds directly into separation unit 44. Separation unit 44 comprises a bottom stream 46 and top stream 48. Bottom stream 46 is a return stream which comprises monomers which can be fed back to reactor 16. Top stream 48 comprises the volatile diaryl carbonate by-product.

Overhead streams 26, 28, and 30, can be fed to the same separation unit 44 or to different separation units. Overhead streams 26, 28, and 30 can be collectively fed to a recovery system (e.g., purification system) comprising for instance, a first purifying column 32 and a second purifying column 34. Streams 36 and/or 38 can be merged with stream 48 or can be independently processed.

The method is further illustrated by the following non-limiting examples.

EXAMPLES

The weight percentage of oligomers was measured by weighting 5 grams of the desired sample in a flask, dissolving it in 50 milliliters (ml) methanol under vigorous stirring for 1 hour, filtering the non soluble product through a paper filter, washing the solid retained in the filter with another 50 ml methanol, drying the non soluble product for 15 minutes in an oven at temperature below 100° C., and finally weighing the dried solid collected.

Comparative Example 1 and Examples 1a-c

A sample was obtained from bottom of a scrubber on a commercial polycarbonate reactor system and had an initial oligomer content of 21 weight percent based on the total weight of the sample. This sample was introduced in the melt reactor without adding anything else. This sample was obtained from the commercial system during a period of operation where there was formation of crystallline oligomers at the bottom of the scrubber and operation of the separation system could not be maintained. Diphenyl carbonate (DPC), hydroquinone (HQ) and bisphenol A (BPA) were the monomers used in the commercial polycarbonate reactor as starting materials with tetramethyl ammonium hydroxide and NaOH as polymerization catalysts.

A laboratory scale melt reactor was passivated by acid washing, rinsing and drying with nitrogen gas. A sample from the commercial reactor was introduced in the laboratory melt reactor without anything else and was heated to 180° C. under 165 millibars (mbar) vacuum for 1 hour, similar conditions as those found in the scrubber in the commercial plant. The oligomer content of the sample increased from 21% to 28%.

The same reaction was carried out as in Comparative Example 1 with the exception that a given amount of a low vapor pressure compound, ammonium phosphate ($NH_4H_2PO_4$), was added to the sample before its introduction in the laboratory melt reactor. Different levels of $NH_4H_2PO_4$ were tested, and the oligomer content after the reaction was measured. The amounts of $NH_4H_2PO_4$ shown below are parts by weight per million parts by weight of the total sample.

| Examples | $NH_4H_2PO_4$ (ppm) | % wt oligomers |
|---|---|---|
| Comparative Example 1 | 0 | 28 |
| Example 1a | 0.3 | 22 |
| Example 1b | 0.1 | 23 |
| Example 1c | 0.05 | 24 |

The results show that the introduction of small amounts of a low vapor pressure compound such as an acidic compound can decrease the amount of solidified oligomer that forms under the conditions present in a scrubber. As the amount of low vapor pressure compound increases the generation of oligomers decreases.

Comparative Example 2 and Examples 2a and 2b

The laboratory melt reactor was passivated by acid washing, rinsing and drying with nitrogen gas, and it was charged with a mixture of hydroquinone (HQ), bisphenol A (BPA) and diphenyl carbonate (DPC) monomers. The molar ratio of the dihydroxy compounds was HQ/BPA 80/20. The molar ratio of diaryl carbonate to dihydroxy compound (DPC/(HQ+BPA)) was 2 (no oligomers at all were present initially in this sample). An amount of catalyst (10 ppm tetrabutyl phosphonium acetate (TBPA)) was added to the mixture, and the mixture was then heated to 180° C. under 165 mbar vacuum for 1 hour. The oligomer content of the sample increased to 12%.

The same reaction was carried out as in Comparative Example 2 with the exception that, besides the 10 ppm of TBPA, a given amount of $NH_4H_2PO_4$ was also added to the sample before its introduction in the melt reactor. The molar ratio $NH_4H_2PO_4$/TBPA added to the mixture was 0.5 and 1.0 for Examples 2a and 2b, respectively, and the oligomer content after the reaction was 15.8% and 3.9% respectively.

| Examples | TBPA (ppm) | $NH_4H_2PO_4$/TBPA MolRatio | % wt oligomers |
|---|---|---|---|
| Comp Ex. 2 | 10 | 0 | 12 |
| Ex. 2a | 10 | 0.5 | 15.8 |
| Ex. 2b | 10 | 1.0 | 3.9 |

As can be seen from the data, the amount of acidic compound added to the scrubber must be sufficient to reduce catalytic activity.

Examples 3 and 4 and Comparative Example 3

Conditions for the first polymerization reactor in a continuous melt polymerization system were selected (200° C. and 330 mbar), so as to reduce the amount of overheads leaving the first polymerization reactor and being sent to separation unit, without affecting the polymerization process, building the same molecular weight in the following polymerization reactor. At the same time, a fixed amount of component diphenyl carbonate (3.6% of the total diphenyl carbonate added to the polymerization process) was added continuously to the vapor by-product stream from the first polymerization reactor to the separation unit. Besides that, a continuous stream of a $NH_4H_2PO_4$ solution in water was added to the middle of the separation unit (resulting in 1.5 ppm $NH_4H_2PO_4$ based on the stream of bottom of the separation unit that is sent back to the first polymerization reactor). When in steady state, samples were taken from bottom of the separation unit to measure the weight percent of oligomer content, running continuously for 12 days without any operational issue with the separation unit (Example 3).

In Example 4, the continuous system was run in the same way, except that more severe process conditions were selected for first polymerization reactor (225° C. and 165 mbar), and these conditions ran for 1 day without any operational issue.

In Comparative Example 3, conditions for the first polymerization reactor were the same as in Example 4. Besides that, the diphenyl carbonate stream was added directly to the first polymerization reactor itself, instead of adding it to the by-product vapor stream from first polymerization reactor to the scrubber. Moreover, the $NH_4H_2PO_4$ stream to the middle of the separation unit was removed. Operation could not be maintained more than 2 days, as the vacuum in the first polymerization reactor was lost due to oligomer deposition in the separation unit bottoms with subsequent clogging of this line.

| Examples | IV R1 | IV R2 | % wt oligomers | operation days | clogging |
|---|---|---|---|---|---|
| Example 3 | 0.040 | 0.14 | 2.0 ± 0.9 | 12 | NO |
| Example 4 | 0.053 | 0.11 | 12.3 ± 1.0 | 1 | NO |
| C Ex. 3 | 0.053 | 0.12 | 22.2 ± 2.5 | 2 | YES |

As can be seen from the foregoing examples the addition of a low vapor pressure compound, such as a low vapor pressure monomer or acidic compound can reduce the amount of oligomer formation and promote the steady operation of the polymerization system.

It is first noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt. %, with 5 wt. % to 20 wt. % desired," are inclusive of the endpoints and all intermediate values of the ranges of "5 wt. % to 25 wt. %," etc.). Unless defined otherwise, technical and scientific terms used herein have the same meaning as is commonly understood by one of skill in the art. The modifier "about" used in connection with a quantity is inclusive of the stated value and has the meaning dictated by the context, (e.g., includes the degree of error associated with measurement of the particular quantity).

In describing the arrangement of devices (e.g., reactors, purifying devices, and the like) within a system, the terms "upstream" and "downstream" are used. These terms have their ordinary meaning. However, it is envisioned that a device may be both "upstream" and "downstream" of the same device in certain configurations, e.g., a system comprising a recycle loop.

While the present invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

The invention claimed is:

1. A method of making polycarbonate comprising polymerizing, in a melt polymerization reaction, an aromatic dihydroxy compound and a diaryl carbonate in a presence of a polymerization catalyst and producing a by-product vapor stream comprising the aromatic dihydroxy compound, the diaryl carbonate and a diaryl carbonate by-product, adding a low vapor pressure compound to the by-product vapor stream to produce a modified by-product vapor stream, introducing the modified by-product vapor stream to a separation unit, and removing the volatile diaryl carbonate by-product from the modified by-product vapor stream in the separation unit to form a treated by-product stream and returning the treated by-product stream to the melt polymerization reaction.

2. The method of claim 1, wherein the low vapor pressure compound comprises bisphenol A.

3. The method of claim 1, wherein the low vapor pressure compound comprises the diaryl carbonate.

4. The method of claim 1, wherein the low vapor pressure compound comprises an acidic compound.

5. The method of claim 1, wherein the diaryl carbonate is diphenyl carbonate.

6. The method of claim 1, wherein the low vapor pressure compound comprises $NH_4H_2PO_4$.

7. The method of claim 1 wherein the low vapor pressure compound comprises an acidic compound and the diaryl carbonate.

8. The method of claim 1, wherein the by-product vapor stream comprises oligomers.

9. The method of claim 1, wherein the low vapor pressure compound has a boiling point at least 10 degrees higher than the boiling point of the volatile diaryl carbonate by-product under separation unit operating conditions.

10. The method of claim 1, wherein the low vapor pressure compound comprises a dihydroxy compound and the amount of the low vapor pressure compound is greater than or equal to 0.5 weight percent of the total amount of dihydroxy compound added to the polymerization reaction.

11. The method of claim 1, wherein the low vapor pressure compound comprises the diaryl carbonate and the amount of the low vapor pressure compound is greater than or equal to 0.5 weight percent of the total amount of diaryl carbonate added to the polymerization reaction.

12. The method of claim 1, wherein the low vapor pressure compound is an acidic compound and the amount of the acidic compound is 10 to 300 microequivalents based on the moles of the dihydroxy compound present in the by-product vapor stream.

13. The method of claim 1, wherein the low vapor pressure compound comprises bisphenol A, the diaryl carbonate, an acidic compound or a combination of two or more of the foregoing.

14. A method of making polycarbonate comprising polymerizing, in a melt polymerization reaction, an aromatic dihydroxy compound comprising hydroquinone and bisphenol A and diphenyl carbonate in a presence of a polymerization catalyst and producing a by-product vapor stream comprising hydroquinone, bisphenol A, diphenyl carbonate and phenol, adding a low vapor pressure compound to the by-product vapor stream to produce a modified by-product vapor stream, introducing the modified by-product vapor stream to a separation unit, removing the phenol from the modified by-product vapor stream in the separation unit to form a treated by-product stream and returning the treated by-product stream to the polymerization reaction.

15. The method of claim 14, wherein the low vapor pressure compound comprises an acidic compound.

16. The method of claim 14, wherein the low vapor pressure compound comprises bisphenol A.

17. The method of claim 14, wherein the low vapor pressure compound comprises an acidic compound and diphenyl carbonate.

18. The method of claim 14, wherein the low vapor pressure compound comprises an acidic compound and bisphenol A.

19. The method of claim 14, wherein the separation unit is a scrubber.

20. A method of making polycarbonate comprising polymerizing, in a melt polymerization reaction, an aromatic dihydroxy compound and a diaryl carbonate in a presence of a polymerization catalyst and producing a by-product vapor stream comprising the aromatic dihydroxy compound, the diaryl carbonate and a diaryl carbonate by-product, adding a low vapor pressure compound to a separation unit, introducing the by-product vapor stream to the separation unit, and removing the volatile diaryl carbonate by-product from the by-product vapor stream in the separation unit to form a treated by-product stream and returning the treated by-product stream to the melt polymerization reaction.

21. The method of claim 20, wherein the low vapor pressure compound comprises bisphenol A.

22. The method of claim 20, wherein the low vapor pressure compound comprises the diaryl carbonate.

23. The method of claim 20, wherein the low vapor pressure compound comprises an acidic compound.

24. The method of claim 20, wherein the diaryl carbonate is diphenyl carbonate.

25. The method of claim 20, wherein the low vapor pressure compound comprises $NH_4H_2PO_4$.

26. The method of claim 20, wherein the low vapor pressure compound comprises an acidic compound and the diaryl carbonate.

27. The method of claim 20, wherein the by-product vapor stream comprises oligomers.

28. The method of claim 20, wherein the low vapor pressure compound has a boiling point at least 10 degrees higher than the boiling point of the volatile diaryl carbonate by-product under separation unit operating conditions.

29. The method of claim 20, wherein the low vapor pressure compound comprises a dihydroxy compound and the amount of the low vapor pressure compound is greater than or equal to 0.5 weight percent of the total amount of dihydroxy compound added to the polymerization reaction.

30. The method of claim 20, wherein the low vapor pressure compound comprises the diaryl carbonate and the amount of the low vapor pressure compound is greater than or equal to 0.5 weight percent of the total amount of diaryl carbonate added to the polymerization reaction.

31. The method of claim 20, wherein the low vapor pressure compound is an acidic compound and the amount of the acidic compound is 10 to 300 microequivalents based on the moles of the dihydroxy compound present in the by-product vapor stream.

32. The method of claim 20, wherein the method is continuous.

33. A method of making polycarbonate comprising polymerizing, in a melt polymerization reaction, an aromatic dihydroxy compound comprising hydroquinone and bisphenol A and diphenyl carbonate in a presence of a polymerization catalyst and producing a by-product vapor stream comprising hydroquinone, bisphenol A, diphenyl carbonate and phenol, adding a low vapor pressure compound to a separation unit, introducing the by-product vapor stream to the separation unit, removing the phenol from the by-product vapor stream in the separation unit to form a treated by-product stream and returning the treated by-product stream to the polymerization reaction.

34. The method of claim 33, wherein the low vapor pressure compound comprises an acidic compound.

35. The method of claim 33, wherein the low vapor pressure compound comprises bisphenol A.

36. The method of claim 33, wherein the low vapor pressure compound comprises an acidic compound and diphenyl carbonate.

37. The method of claim 33, wherein the low vapor pressure compound comprises an acidic compound and bisphenol A.

38. The method of claim 33, wherein the separation unit is a scrubber.

* * * * *